S. F. MIOTON.
FLUID MEASURING APPARATUS.
APPLICATION FILED SEPT. 13, 1919.
1,411,503. Patented Apr. 4, 1922.
6 SHEETS—SHEET 1.
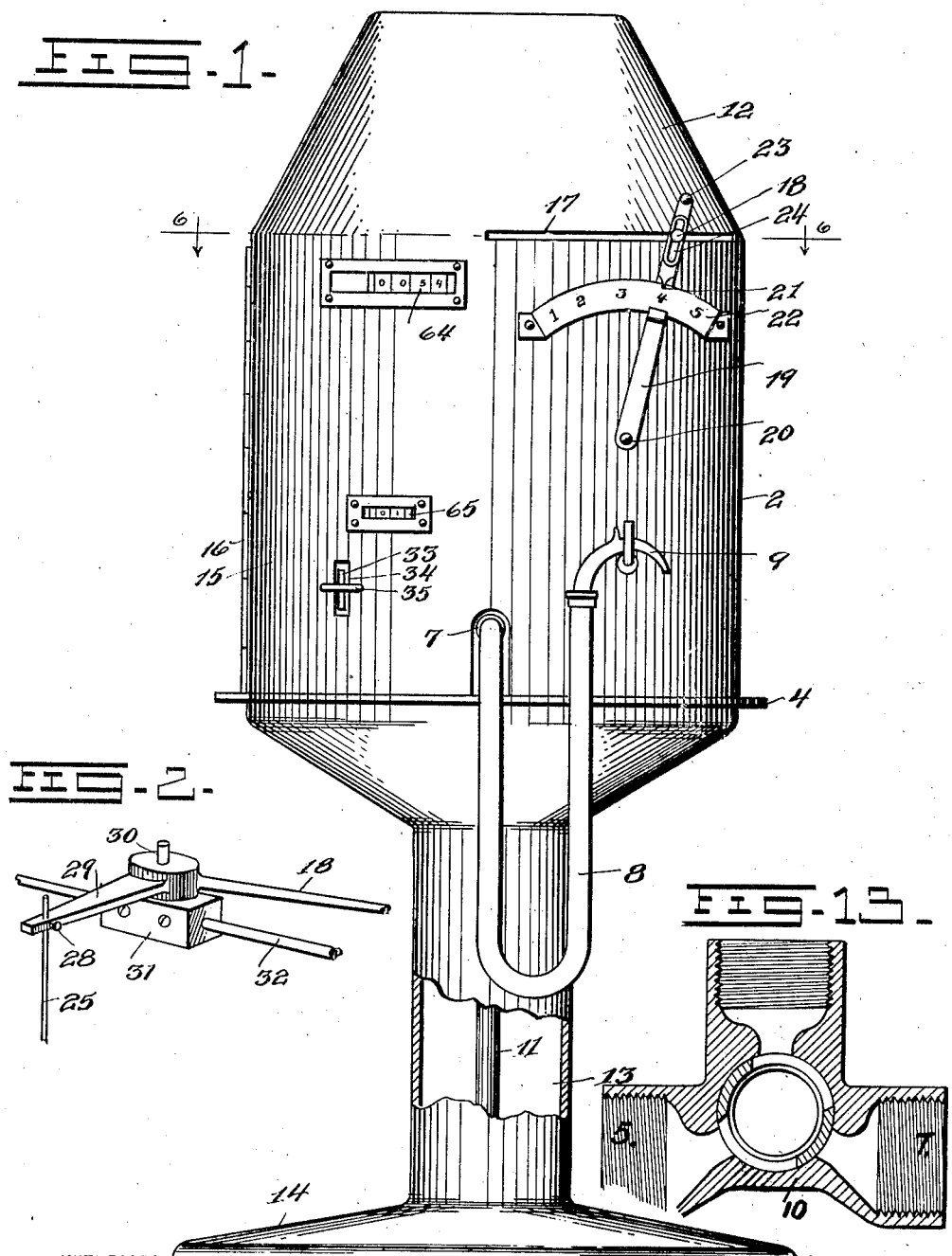

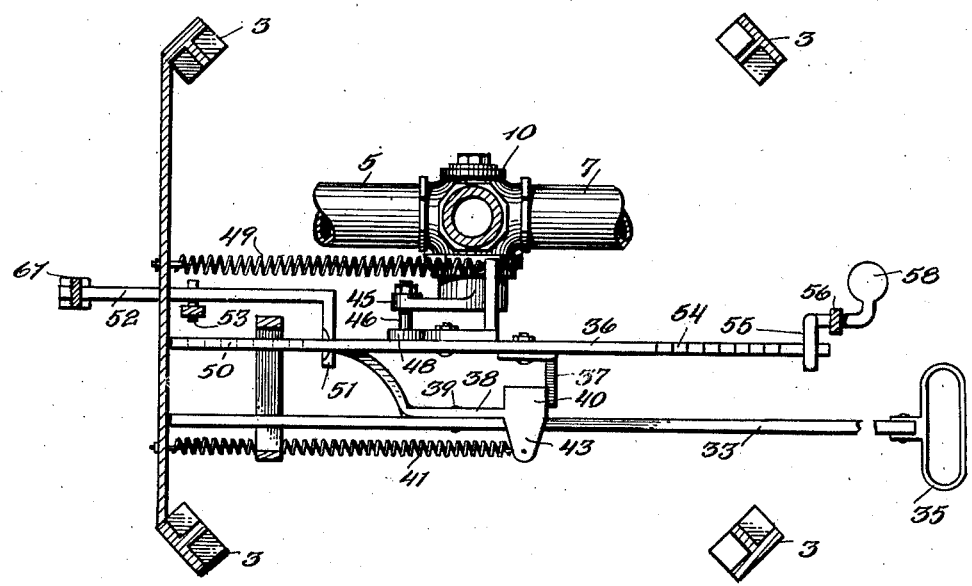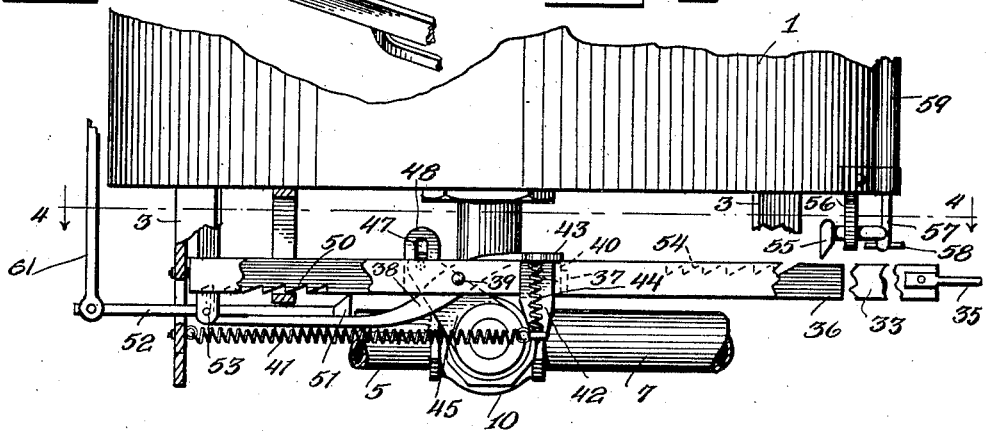

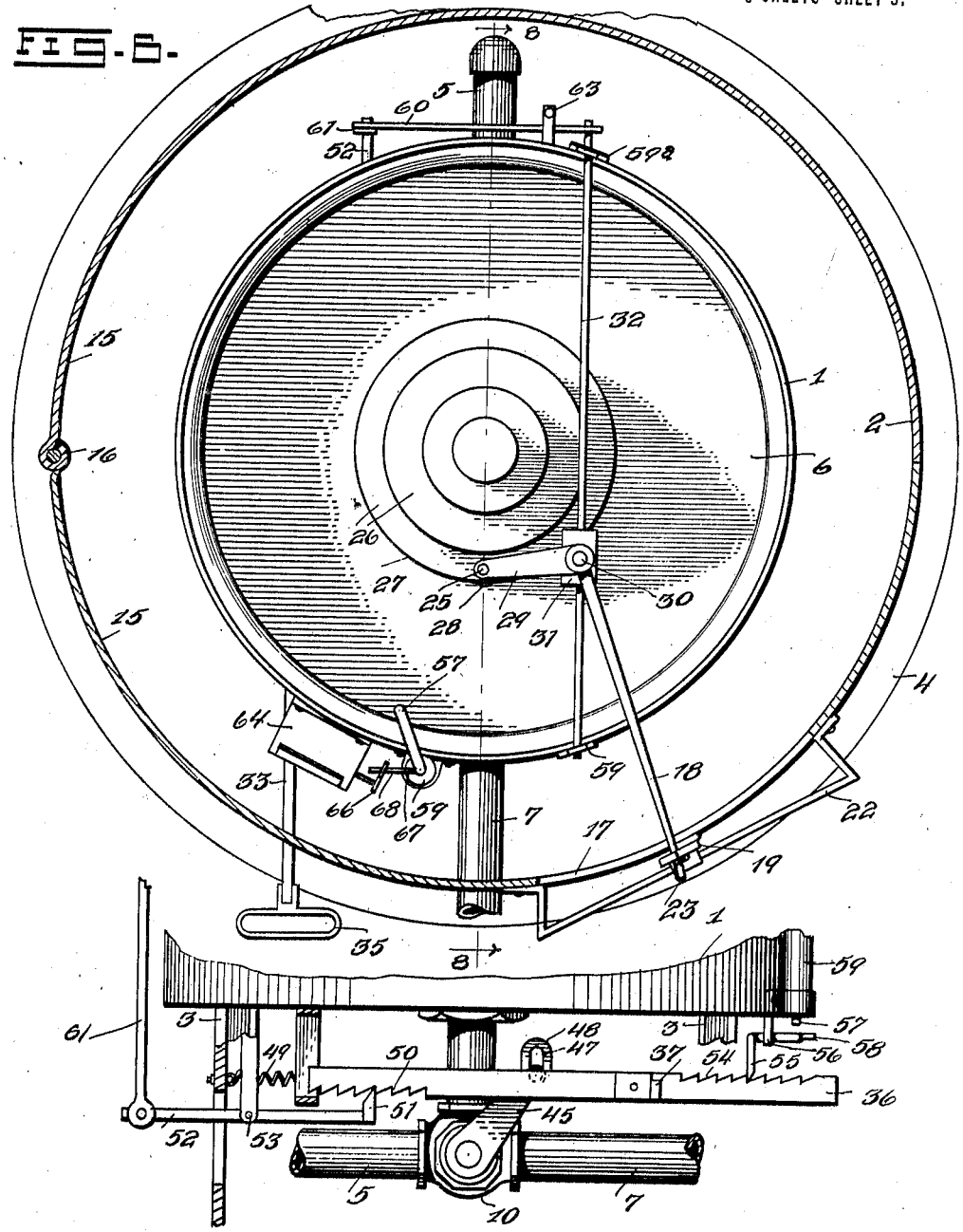

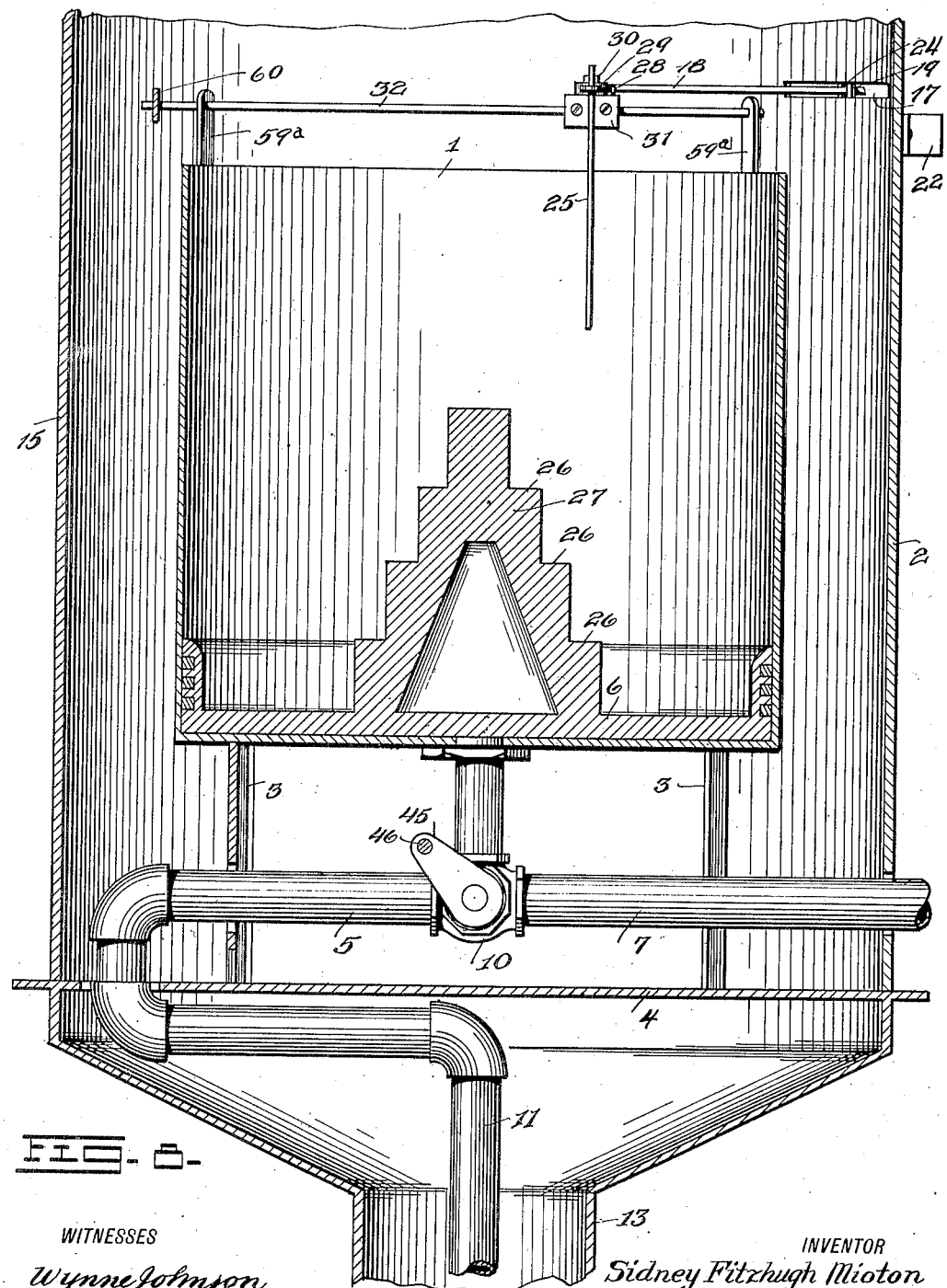

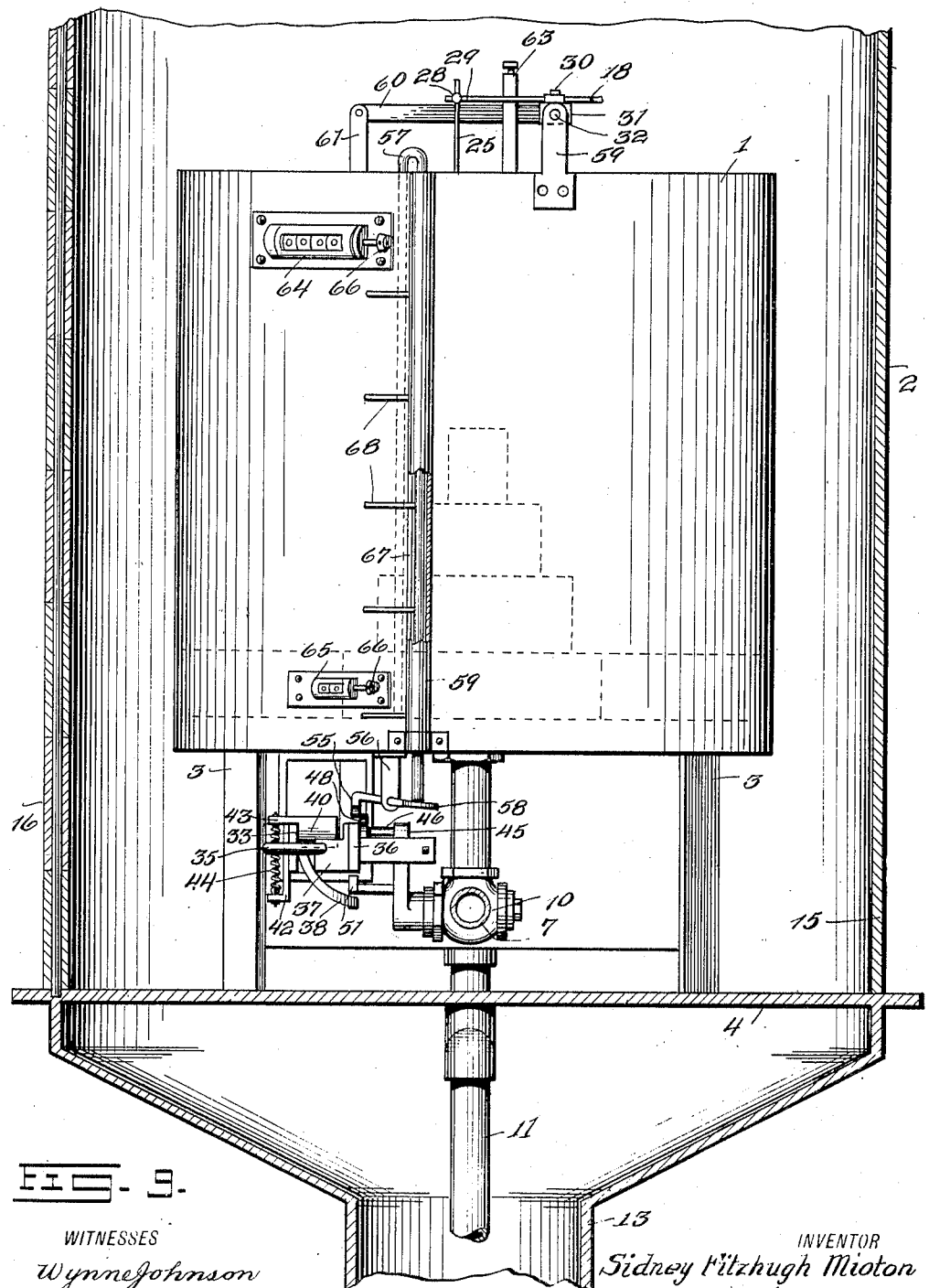

S. F. MIOTON.
FLUID MEASURING APPARATUS.
APPLICATION FILED SEPT. 13, 1919.
1,411,503.
Patented Apr. 4, 1922.
6 SHEETS—SHEET 6.
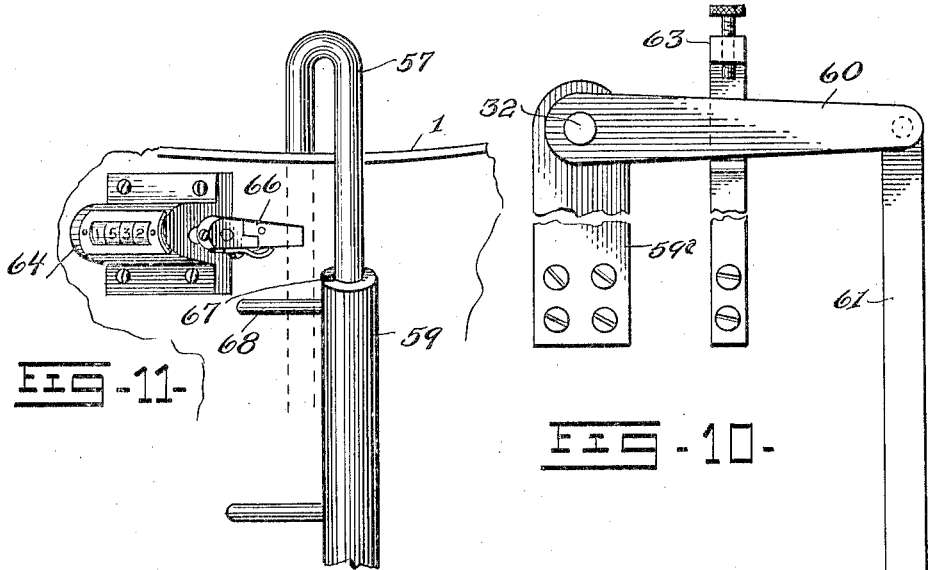
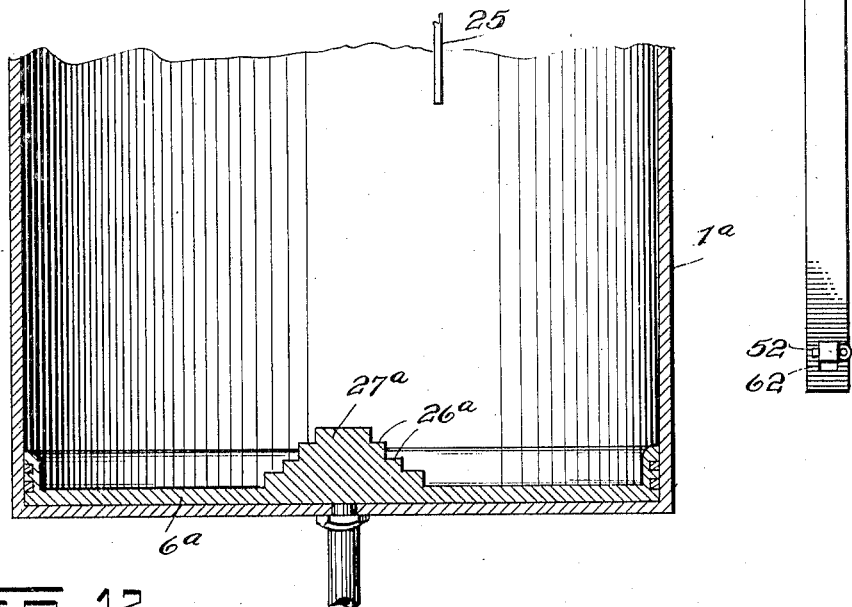
Witnesses.
Wynne Johnson
J. P. Schrott
Inventor
Sidney Fitzhugh Mioton
By Munn & Co
Attorney

UNITED STATES PATENT OFFICE.

SIDNEY FITZHUGH MIOTON, OF NEW ORLEANS, LOUISIANA.

FLUID-MEASURING APPARATUS.

1,411,503.  Specification of Letters Patent.  Patented Apr. 4, 1922.

Application filed September 13, 1919. Serial No. 323,617.

*To all whom it may concern:*

Be it known that I, SIDNEY FITZHUGH MIOTON, a citizen of the United States, and a resident of New Orleans, in the parish of Orleans and State of Louisiana, have invented certain new and useful Improvements in Fluid-Measuring Apparatus, of which the following is a specification.

My invention relates to improvements in fluid measuring apparatus, and it consists in the constructions, combinations and arrangements herein described and claimed.

One of the foremost objects of my present invention is to provide a fluid measuring and dispensing apparatus which is arranged in such a manner that neither a short measure of liquid can be run into the dispensing tank to be dispensed, nor can a short measure be dispensed to the consumer from the dispensing tank.

A further object of the invention is to provide a liquid measuring and dispensing apparatus, so arranged that the fluid inlet valve is locked from being prematurely closed when admitting a supply of liquid to the dispensing tank, and to prevent the same valve from being opened during the operation of discharging the liquid previously admitted to the dispensing tank, after that valve was closed upon the filling of the dispensing tank with a predetermined measure of liquid.

A further object of the invention is to provide means for automatically closing the inlet valve when a predetermined quantity of liquid has been supplied to the dispensing tank.

Other objects and advantages will appear in the following specification, reference being had to the accompanying drawings, in which:—

Figure 1 is a side elevation of the improved liquid measuring apparatus,

Figure 2 is a detail perspective view of the rockable metering pin guide block with its carried parts, Figure 3 is a detail sectional view showing the inlet valve and its cooperating parts in the normal positions, Figure 4 is a horizontal section taken substantially on the line 4—4 of Figure 3, Figure 5 is a detail perspective view of the actuating and valve bars, illustrating the relationship of the initiator pawl and lug.

Figure 6 is a horizontal section taken substantially on the line 6—6 of Figure 1, Figure 7 is a detail sectional view similar to Figure 3, showing the inlet valve and its cooperating parts in the open positions, Figure 8 is a vertical cross section taken substantially on the line 8—8 of Figure 6 and showing the follower piston with its cooperating parts in the normal position, Figure 9 is a front elevation of the dispensing tank, the outer casing and other parts being shown in section, Figure 10 is a detail side elevation of a part of the automatic release mechanism which cooperates with the metering pin to enable the closing of the inlet valve when the proper measure of liquid is supplied to the dispensing tank, Figure 11 is a detail view illustrating the manner of operation of one of the counters or registers, Figure 12 is a detail sectional view of a modification wherein the dispensing tank is filled to a predetermined height before the graduated pyramid comes into operation and Figure 13 is a detail sectional view of the fluid valve hereinafter described.

As indicated generally in the description of the objects of the present invention, this liquid measuring and dispensing apparatus works in such a way that a dishonest operator cannot re-open the main inlet valve while a previously measured quantity of liquid is running from the dispensing tank, the inlet valve having previously closed to shut off the supply of liquid from the main reservoir to the dispensing tank. In other words, any attempt of the operator to re-open the inlet valve while liquid is flowing, with the idea of letting more liquid run into the dispensing tank from the main reservoir and so increase the quantity of liquid dispensed, is absolutely prevented by the mechanism. In order that the reader may easily understand the construction as well as the operation, the various parts are described in regular order below. Attention is first directed to the tank structure. This is best illustrated in Figures 1, 8 and 9. The liquid dispensing tank 1 (Fig. 8) is mounted inside of the upper casing 2 by suitable supporting means 3 which in turn rest on the floor or partition 4 in the casing 2. The dispensing tank 1 is open at the top but closed at the bottom.

Liquid runs in at the bottom through the inlet pipe 5 and lifts the follower piston 6 inside of the dispensing tank. After a predetermined measure of liquid is supplied to the tank 1, it is made to run out of the outlet pipe 7 which terminates in a flexible hose 8 (Fig. 1) with a nozzle 9 on the outside. The inlet valve 10 controls the passage of liquid through the inlet and outlet pipes.

The valve 10 which is shown in detail in Figure 13 is normally closed to the inlet pipe 5, but is normally open to the outlet pipe 7. It is plain, however, that if there is no liquid in the dispensing tank 1, none can run out of the outlet pipe even though the valve stem is open thereto. The position of the valve in Figure 8 is the normal position. The inlet pipe includes the pipe connection 11 which extends to a main reservoir which is not illustrated in the drawings. Ordinarily, the main reservoir is buried in the ground, located overhead or may lead to a pump.

Returning now to the tank and casing structure, it is to be observed in Figure 1 that the outer casing 2 has a frusto-conical and closed top 12. This top may be of any other shape if desired. The casing includes the tubular standard 13 through which the supply pipe 11 runs, and this standard terminates in a base 14 on which the whole structure is supported. A door 15 hinged at 16, enables access to the interior of the casing when inspection of the working parts is required. In this connection it is to be observed that there is a space all around the dispensing tank 1. Various parts of this space are occupied by portions of the actuating mechanism described in detail below. The casing 2 has a slot 17 in which the setting rod 18 of the quantity gauging mechanism operates.

The quantity gauging mechanism includes the gauge arm 19 which is pivoted at 20 on the outside of the casing 2, and has a pointer 21 which points to the various indications on the arcuate dial 22. The gauge arm 19 has a handle 23 by means of which it is moved. The setting rod 18 extends through a slot 24 in the upper end of the gauge rod.

As the gauge arm 19 is moved to the right until the pointer 21 points to the desired indication on the dial 22, the setting rod 18 is also moved to the right so that the metering pin 25 (Fig. 6) stands over that particular one of a plurality of steps 26 on the graduated pyramid 27, coinciding with the indicator pointer 21.

It is to be observed in Figure 6 that the setting rod is in the nature of a bell crank. The metering pin 25 is adjustably fixed at 28 in the extremity of the short arm 29. The setting rod is pivotally mounted at 30 on the bearing block 31. This bearing block is in turn mounted on a rock rod 32 which extends across the dispensing tank.

When that one of the steps 26 of the graduated pyramid 27 then in line with the pendent metering pin 25, engages the metering pin by reason of the raising of the follower piston 6 by the inflow of liquid, the rock rod 32 is caused to rock and thereby enable the automatic closing of the inlet valve 10. The structure and other actions involved in the closing of the valve 10 is fully described in the description of the supply stopping mechanism.

The reader will observe at once that the farther the gauge arm 19 is moved to the right, the farther out will the metering pin 25 be moved over the graduated pyramid 27. According to the present position of the gauge arm 19, the metering pin 25 will be engaged by the fourth surface or step counting down from the top of the pyramid. Therefore, the dispensing tank 1 will fill until the follower piston 6 moves up high enough to cause such engagement, when the inlet valve 10 will be automatically closed. Were the pointer 21 moved over to the left until it pointed to "1", the metering pin 25 would come directly over the top of the pyramid and the follower piston 6 could move up only so far as the distance between the pyramid and the top of the metering pin 25 will permit.

The initiating mechanism is operated after the gauge arm 19 is set to the proper place so as to indicate the quantity of liquid desired to be let into the dispensing tank 1 and subsequently dispensed. First of all, there is the actuating bar 33 (Fig. 3) which extends through the opening 34 in the casing 2, and has a handle 35 on the outside, by means of which the operator moves the bar out when he desires to start the filling of the dispensing tank 1.

On pulling the actuating bar 33 out, the valve bar 36 (Fig. 7) is moved in the same direction. They both move together. This movement of the valve bar opens the valve 10 so that communication is established between the inlet pipe 5 and the dispensing tank 1. Liquid now runs in from the overhead or concealed reservoir. The means whereby the valve bar 36 is made to move toward the right with the actuating bar 33, comprises the initiator lug 37 extending sidewise at right angles from the bar 36, and the initiator pawl 38 pivoted at 39 on the actuating bar 33.

The head 40 of the pawl 38 is normally in engagement with the lug 37. It is easy to see, therefore, how the valve bar 36 must initially move with the actuating bar 33. The rear under surface of the head 40 is rounded so that it can move over the lug 37 when the operator lets the handle 35 go, as plainly shown in Fig. 5.

A spring 41 serves to return the actuating bar 33 when released. The right end of the spring is connected to a bracket 42 secured to the bar. A portion 43 of the pawl 38, extends over the bar 33, and a spring 44 is secured between the bracket and extension. This spring keeps the pawl 38 in the normal lug engaging position.

The valve 10 (Fig. 3) has a handle 45 with a pin 46 which operates in the slot 47 of a bracket 48 on the valve bar 36. The valve bar 36, being moved toward the right as explained above, turns the handle 45 toward the right to open the valve 10 to the liquid inlet pipe 5, through the pin and slot connections 46, 47. The valve bar 36 moves toward the right against the tension of a spring 49, (Fig. 4) which is connected to an outwardly extending portion of the bracket 48.

So far as described, the reader understands that the valve 10 is opened by pulling the actuating bar 33 out. This bar may be held out with no effect on the mechanism or the operation thereof. It should be released and allowed to move back to normal position. The valve bar 36, however, remains in the position to which it was moved toward the right, until the dispensing tank 1 is filled to the required level. The valve bar 36 remains in this position by virtue of the engagement of one of the teeth of a rack 50 on the lower side of the bar, with the nose 51 of the release pawl 52. The pawl 52 is pivoted at 53. This leads to the explanation of the supply stopping operation, but before entering this description, there is one part of the mechanism which should be described first.

The valve bar 36 has a second rack 54 on the upper edge at the end opposite to that on which the rack 50 is made. A tappet pawl 55, pivoted at 56 and normally out of engagement with the rack 54, engages the rack when the operation of filling the dispensing tank 1 commences. A yoke 57 normally keeps the pawl 55 away from the rack by bearing down on the tappet plate 58.

One leg of the yoke 57 is mounted for vertical sliding movement in the sleeve 59, the yoke thereafter bending over the upper edge of the dispensing tank 1 and reaching down so that the other leg bears on the follower piston 6 as clearly shown in Figure 9. As long as the weight of the yoke 57 bears on the tappet 58, it is easy to see that the pawl 55 will remain raised from the rack. But as soon as the filling operation commences, the piston 6 (Fig. 8) begins to rise, carrying the yoke 57 with it and relieving the tappet 58 of the weight of the yoke, thereby permitting the pawl 55 to engage the rack. Proceeding now with the supply stopping operation it has been shown how the rock rod 32 (Fig. 6) is partially turned in its bearing 59ª, on the engagement of the metering pin 25 by one of the steps 26 of the pyramid 27. Upon such partial turning of the rock rod 32, the release arm 60 on the rod raises the release link 61 and causes the rocking of the pawl 52 on its fulcrum 53. The nose 51 is thereby disengaged from the rack 50, and the valve bar 36 is moved back toward the left by virtue of the spring 49, thereby carrying the valve handle 45 toward the left and closing the inlet valve 10 to the liquid supply pipe 5. As already explained, on closing the valve 10 the reopening of the valve during the outflow of the measured liquid, is absolutely prevented by the tappet pawl 58. Therefore, any attempt to increase the quantity of liquid to be dispensed, is automatically prevented in the manner clearly stated above, and it is also clearly seen that it is impossible to prematurely close the valve 10 before full measure is obtained, because of pawl 51.

The link 61 (Fig. 10) has a short slot 62 into which the end of the pawl 52 extends. A very short movement of the link 61 thus occurs before the pawl 52 is actuated but the slot is more particularly for the purpose of providing a sufficiently loose connection between the pawl and link. Adjusting means 63 cooperates with the release arm 60 to vary the height to which the arm can be lifted.

The liquid, measured in the manner above described, is now running out of the dispensing tank 1. The tappet pawl 55 is still in engagement with the rack 54 of the bar 36, because the yoke 57 is still held off of the tappet plate 58 by virtue of the elevated position of the follower piston 6 which supports rod 57 up and off of tappet 55. Should the operator now desire to let in an additional quantity of liquid into the dispensing tank while the previously measured quantity is still flowing, he will be prevented from pulling the actuating bar 33 out by reason of the engagement of the tappet pawl 55 with the rack 54. It is not until all of the liquid has run out of the dispensing tank 1 and the follower piston 6 has again settled on the bottom of the tank, that the actuating bar 33 can be pulled out, because it is not until then that the tappet pawl 55 is released from the rack 54 by weight of bar 57.

The registering means comprises an upper register 64 for registering the total number of gallons of liquid dispensed from the apparatus, and a lower register 65 for indicating the number of times the apparatus is operated. The construction of both registers is precisely alike and therefore attention is directed to Figure 11 wherein one, together with its operating mechanism, is shown in detail.

The register 64 has a trip arm 66 which is operative on an upstroke but not on a down stroke. The sleeve 59 in which the outer leg of the yoke 57 slides vertically, has a lateral slot 67 through which a plurality of trip pins 68 extend. These pins keep the yoke 57 from turning in respect to the sleeve 59, but are more particularly for the purpose of successively actuating the trip arm 66 on the register 64, so that as successive gallons of liquid are let into the measuring tank, they are counted by successive operations of the trip arm.

To this end, the trip pins 68 are properly spaced apart. It will be understood at once that the lower register 65 is operated only once, each time the yoke 57 is elevated. It therefore makes no difference whether one or more gallons are measured in a measuring operation.

The modification in Figure 12 illustrates an arrangement whereby a relatively large quantity of liquid can be supplied to the dispensing tank 1ª before the supply stopping mechanism comes into operation. This arrangement is intended for use where large drums are to be filled, as for example, drums holding in the neighborhood of thirty gallons to 35 gallons, 30 gallons a minimum and 35 maximum; the difference existing in each barrel can be adjusted by setting of a trip-pin accordingly.

The dispensing tank 1ª is supposed to be of a considerably greater diameter than that shown in Figure 8. The follower piston 6ª has a relatively low pyramid 27ª, around which the steps 26ª are arranged similarly as in the other form. It will be understood at once that the follower piston 6ª must rise a considerable distance before the desired one of the steps of the pyramid comes into engagement with the metering pin 25. Consequently a comparatively great quantity of liquid, say 30 gallons, will be supplied to the tank 1ª before the stopping operation occurs, and the beginning of that operation depending on the position of the trip-pin.

*The operation.*

Although the complete operation of the apparatus is described above in connection with the various major functions of the machine, it is thought a brief résumé thereof may be of still further aid in the understanding of the invention.

The first act of the operator is to grasp the handle 23 and set the pointer 21 to that mark on the dial 22 which indicates the quantity of gasoline or other liquid he desires to dispense to the user. The moving of the gauge arm 19, to which the pointer 21 is attached, shifts the setting rod 18 on its fulcrum 30, in Figure 6, until the metering pin 25 stands above that one of the steps 26 on the pyramid 27, which corresponds with the mark pointed to on the dial 22.

In other words, if the pointer points to "4," the metering pin will stand above the fourth step 26 counting down from the top.

Consequently, the follower piston 6 will continue to rise when liquid flows into the dispensing tank 1, until that fourth step 26 engages the metering pin, rocks the rod 32 in its bearings 59, lifts the release link 61, disengages the nose 51 of the release pawl 52 from the rack 50 on the under edge of the valve bar 36, and permits this bar to swing back by virtue of the spring 49. It is by this action of the valve bar 36 that the inlet valve 10 is closed.

But it is necessary to first understand how the valve 10 was opened. The second act of the operator, after setting the pointer 21, is to pull the handle 35 out. This moves the actuating bar 36 toward the right. The engagement of the head 40 of the initiator pawl 38 on the bar 33, with the initiator lug 37 on the valve bar 36, causes the valve bar 36 to move toward the right with the actuating bar since the valve bar is connected to the handle 45 of the valve pin by means of the pin and slot connection 46, 47 the valve pin is moved to the open position so that liquid can flow into the dispensing tank 1 from the supply pipes 11, 5. It is explained in the preceding paragraph, how the valve 10 is again closed when the dispensing tank becomes completely filled to the required height, namely, by the engagement of the pyramid with the metering pin. As soon as the follower piston 6 rises from the bottom of the dispensing tank 1, the yoke 57 releases the tappet pawl 55 so that it moves into engagement with the rack 54 on the upper edge of the valve bar 36. This engagement of the tappet pawl is not broken until the dispensing tank is completely emptied, at which time the follower piston again rests on the bottom of the tank and the outer leg of the yoke 57 again bears on the tappet plate 58 of the pawl.

The premature closing of the valve 10, with the possible intention of reducing the quantity of liquid supplied to the tank 1 for dispensation, is absolutely prevented by engagement of the release pawl 52 with the rack 50 on the valve bar. This engagement cannot be broken until the follower piston actuates the metering pin 25. The reopening of the valve 10, during the time a previously measured quantity of liquid is flowing from the dispensing tank 1, with the possible intention of dispensing a greater amount of liquid than the purchaser is paying for, is absolutely prevented by the engagement of the tappet pawl 55 with the teeth of the rack 54 on the valve bar 36.

It is not until the follower piston gets all the way to the bottom of the dispensing tank, that the tappet pawl 55 is released from the rack, and it can be readily seen by the inclination of the teeth 54, that the valve bar cannot be pulled out again to the right so long as the pawl 55 is in engagement.

The operation and purpose of the registers 64 and 65 is fully described under the proper heading, and further description at this time is not thought necessary.

While the construction and operation of the liquid measuring and dispensing apparatus as herein described and claimed, is that of a generally preferred form, obviously modifications and changes may be made without departing from the spirit of the invention or the scope of the appended claims.

I claim:—

1. A fluid measuring receiver, means in the receiver, displaced as the fluid flows in, control means, dually arranged actuating means including a member movable in one direction to open the control means and let fluid flow in, and another member for initially actuating said movable member to produce the aforesaid movement, means for holding said movable member in the position wherein the control means is held open, and means under control of said displaceable means in the receiver, for automatically actuating the holding means and releasing said movable member to permit the control means to close, when a predetermined volume of fluid enters the receiver.

2. Means for controlling the flow of fluid, a directly associated operating member movable in one direction to open the control means, an actuating member, with a connection operative to move said operating member to the opening position, but inoperative to affect the operating member and control means by subsequent actuation while the control means is open; and means for holding said operating member in said position until a predetermined volume of fluid has passed the controlling means.

3. A normally closed fluid control valve, operating means freely movable in two directions, valve actuating means operatively associated with the valve, operatively associated means between both means for opening the valve when the actuating means is moved in one direction, and means for holding said valve actuating means in the open position and releasing it when a predetermined volume of fluid has passed the control valve, regardless of subsequent movements of the operating means in either direction.

4. A fluid receiver, a valve movable in one position to admit fluid to the receiver, and to a normal position to let a measured quantity of the fluid out; an operatively associated valve bar with one rack on top and another on the bottom, actuating means including a connection operative to move the bar and valve to the position to let fluid flow in, means engaging the bottom rack preventing the premature closing of the valve until a full measure flows into the receiver, follower means in the receiver displaced from a normal position as fluid flows in, instrumentalities operatively associated with said piston for releasing said holding means and permitting the bar and valve to automatically move to a closed position upon the inflow of a predetermined quantity of fluid, and instrumentalities rendered operative when the follower means initially leave the normal position, to engage the top rack on the valve bar, and remain in such engagement until all of the measured fluid flows out through the valve, thereupon being released upon the follower means reaching the normal position.

5. The combination, of a valve bar, with an operatively associated inlet valve; having engageable means including an initiator lug, and manually actuatable means for moving the valve bar in one direction to open the valve, including an actuating bar with an initiator pawl, so mounted on the bar as to operate the valve bar in one direction only.

6. The combination, of a follower piston arranged to move by fluid pressure, a yoke with one leg bearing on the piston, a fixedly mounted sleeve with a slot receiving the other leg, and a pin fixed in said leg and extending through the slot.

7. The combination, of a follower piston movable by fluid pressure, a relatively fixed sleeve with a longitudinal slot, a yoke having one leg bearing on the piston and the other leg slidable in said sleeve; and a plurality of pins fixed in said other leg and extending through said slot.

8. The combination, of a receiver, a follower piston movable in the receiver by fluid pressure, a yoke bending over the edge of the receiver, including one leg on the inside bearing on the piston, and another leg on the outside; a slotted sleeve fixed on the receiver, a plurality of pins carried by the outer leg in the sleeve and extending through the slot, and operatively associated counters arranged to be actuated by said pins.

9. In fluid measuring apparatus, means for gauging the fluid, including a rock rod, a bearing block carried thereby, a setting rod with a short arm, pivotally mounted on said block; and a metering pin adjustably mounted in said short arm.

SIDNEY FITZHUGH MIOTON.